United States Patent

Kalbskopf

[15] 3,704,009
[45] Nov. 28, 1972

[54] TURBOVENTILATOR FOR THE INPUT OF OXYGEN INTO LIQUIDS

[72] Inventor: Karl-Heinz Kalbskopf, Oberhausen, Germany

[73] Assignee: FMC Corporation, San Jose, Calif.

[22] Filed: May 3, 1971

[21] Appl. No.: 139,475

Related U.S. Application Data

[63] Continuation-in-part of Ser. No. 71,046, Sept. 10, 1970, abandoned.

[52] U.S. Cl. .................261/91, 261/120, 210/219, 210/220, 210/242
[51] Int. Cl. .................................................B01f 3/04
[58] Field of Search ........261/91, 120; 210/219, 220, 210/242

[56] References Cited

UNITED STATES PATENTS

| 3,573,203 | 3/1971 | Kaelin | 261/91 |
|---|---|---|---|
| 3,360,460 | 12/1967 | Weston | 261/91 |
| 3,329,407 | 7/1967 | Clough et al. | 261/91 |
| 3,576,316 | 4/1971 | Kaelin | 261/91 |
| 3,591,149 | 7/1971 | Auler | 210/219 |
| 3,423,077 | 1/1969 | Gloppen | 261/91 |
| 3,341,450 | 9/1967 | Ciabattari et al. | 261/91 |
| 3,539,158 | 11/1970 | Roos | 261/91 |

Primary Examiner—Tim R. Miles
Assistant Examiner—Steven H. Markowitz
Attorney—F. W. Anderson and C. E. Tripp

[57] ABSTRACT

A turbo ventilator for mechanically aerating sewage to activate the sludge during the biological purification is disclosed. A vertical shaft mounts a plurality of circumferentially spaced box-like jet formers which are rotated at the surface of the liquid. These jet formers supply upstanding radially spaced vanes extending between upper and lower enclosure plates to provide short, box-like jet forming tubes. As these jet formers are rotated in the surface layer of the tank, water is taken in a substantially horizontal plane and is accelerated to produce horizontally travelling jets that entrain bubbles of air. These jets are discrete enough and have enough momentum to reach the walls of the tank whereupon they are deflected downwardly to further oxygenate the body of water in the tank. The water is returned to the inlet sides of the jet former tubes from a whirlpool at the center of the tank and makes smooth and nonturbulent transition to a horizontal flow pattern before it re-enters the aerator jet formers.

20 Claims, 18 Drawing Figures

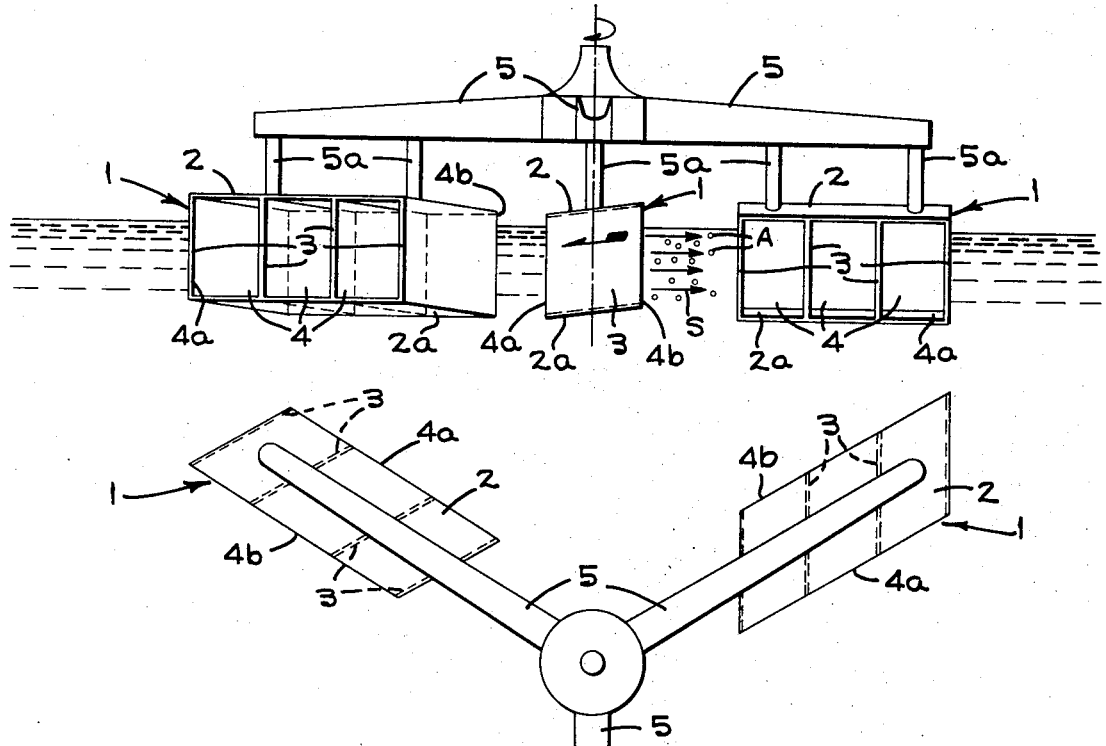
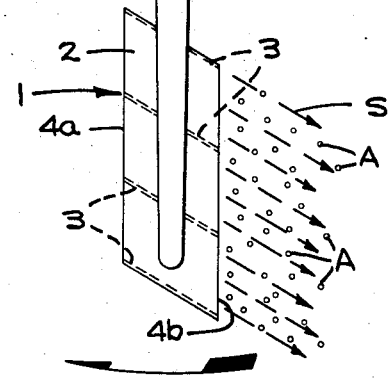
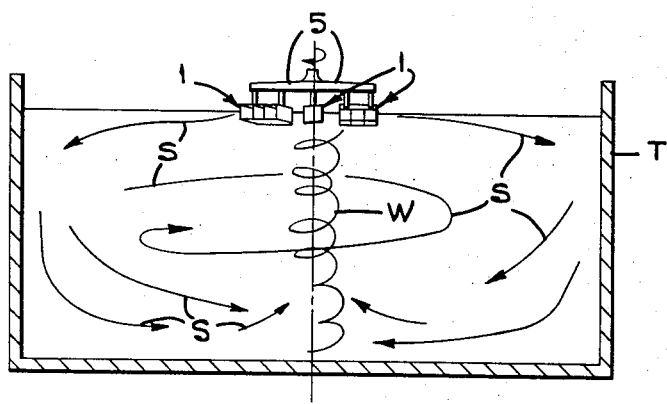
INVENTOR.
KARL-HEINZ KALBSKOPF
BY F. W. Anderson
C. E. Tripp
ATTORNEYS

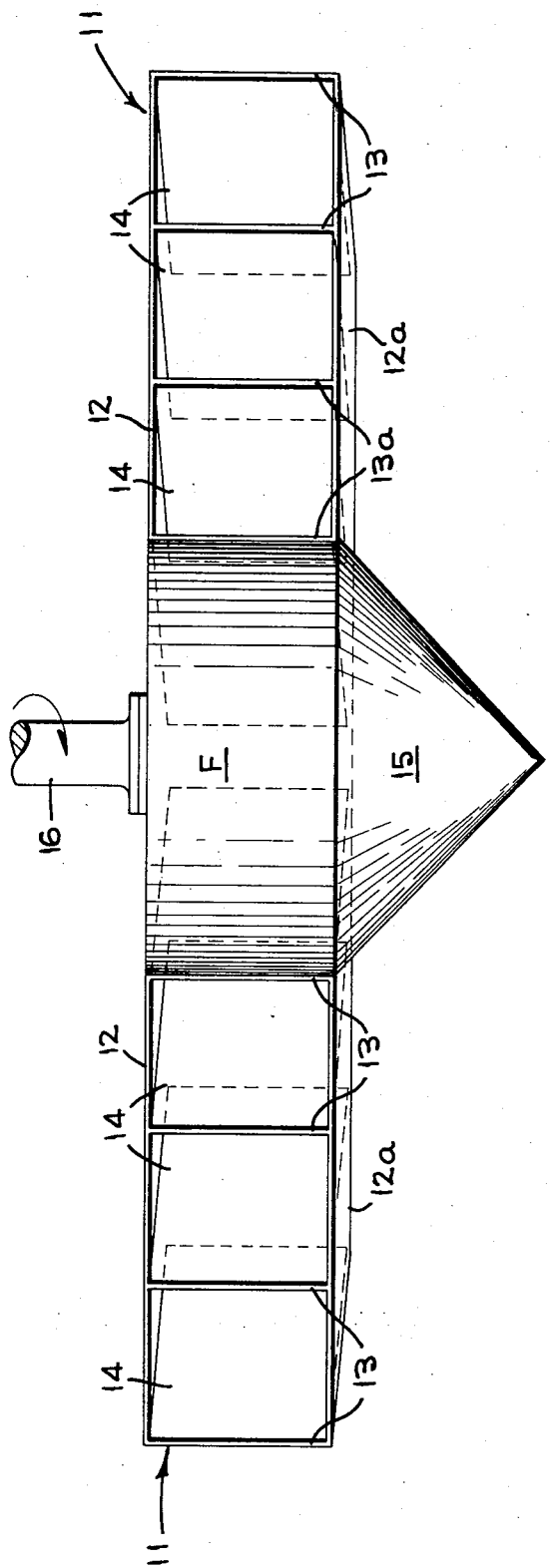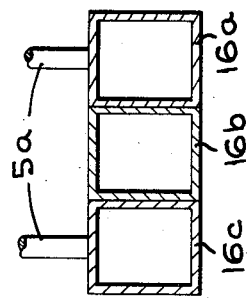

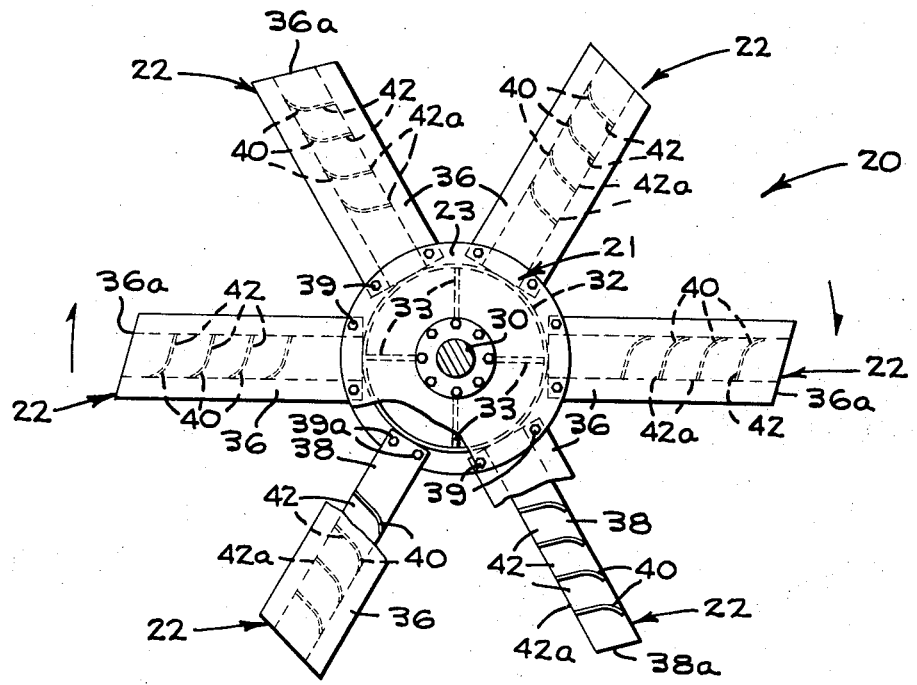
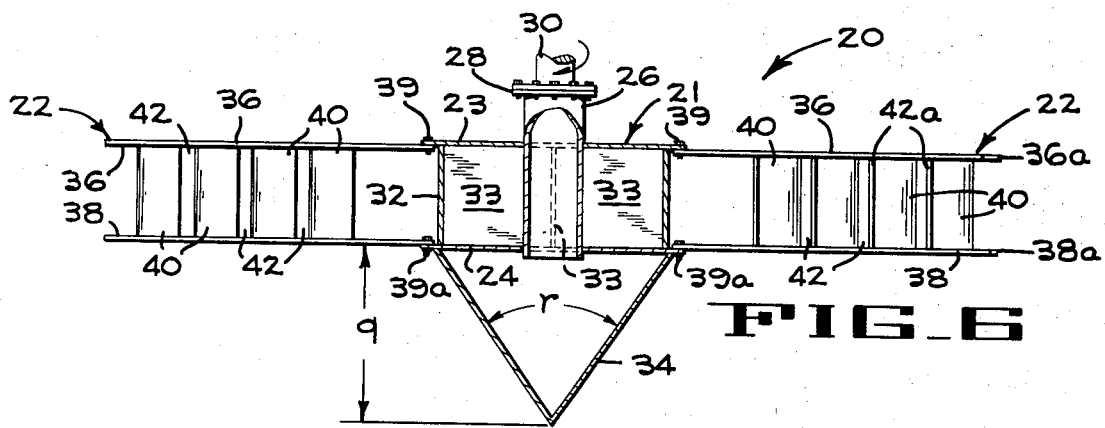
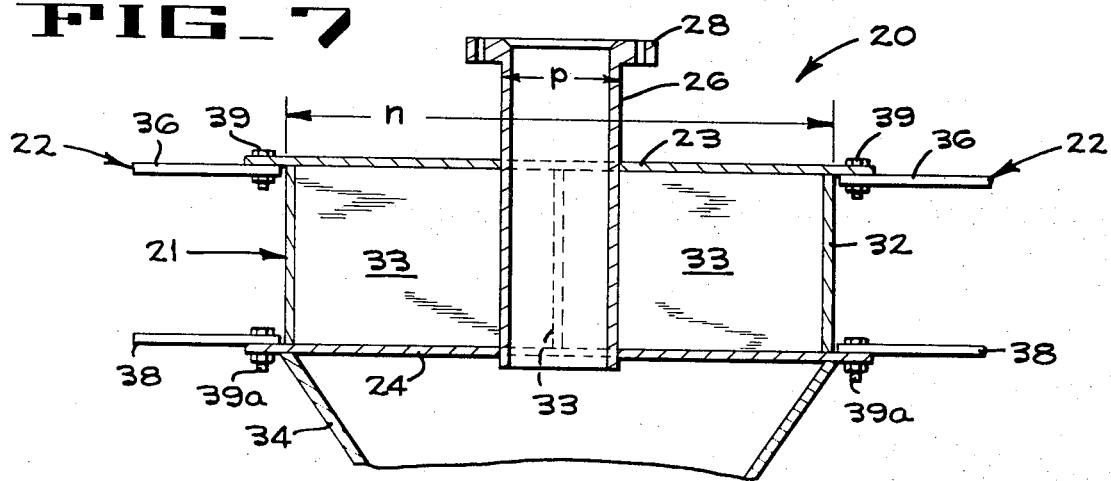

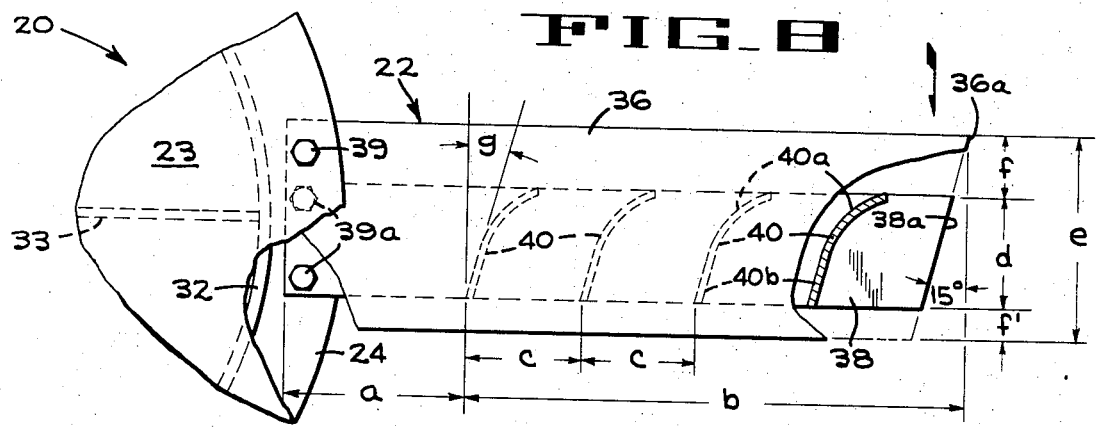
FIG. 8
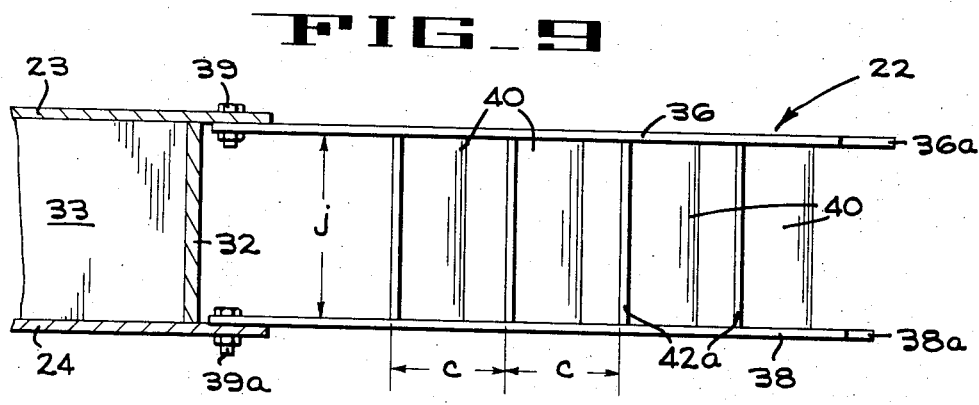
FIG. 9
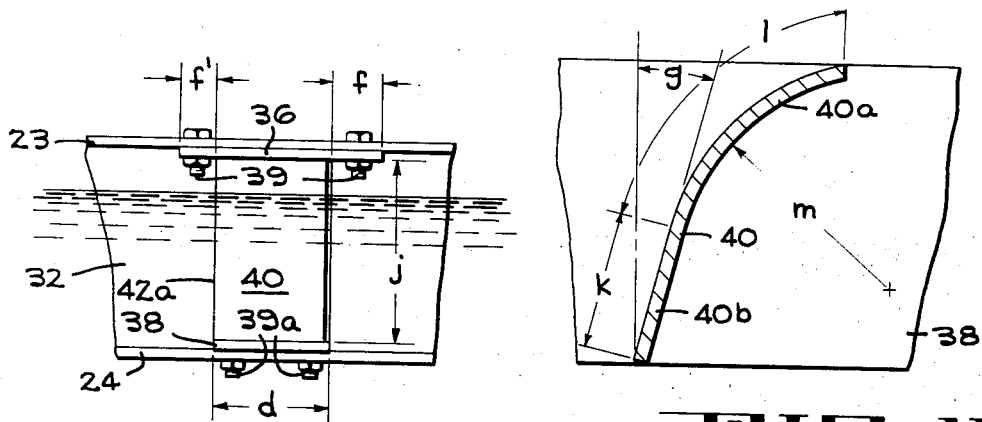
FIG. 10
FIG. 11

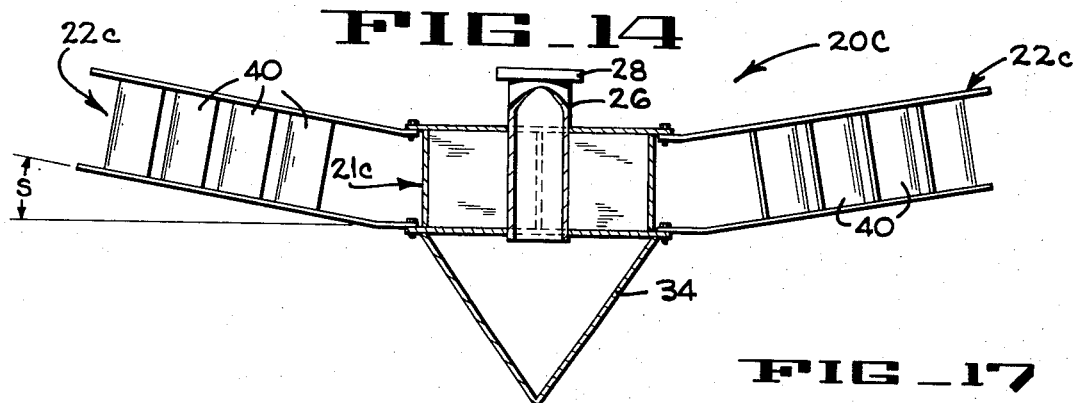
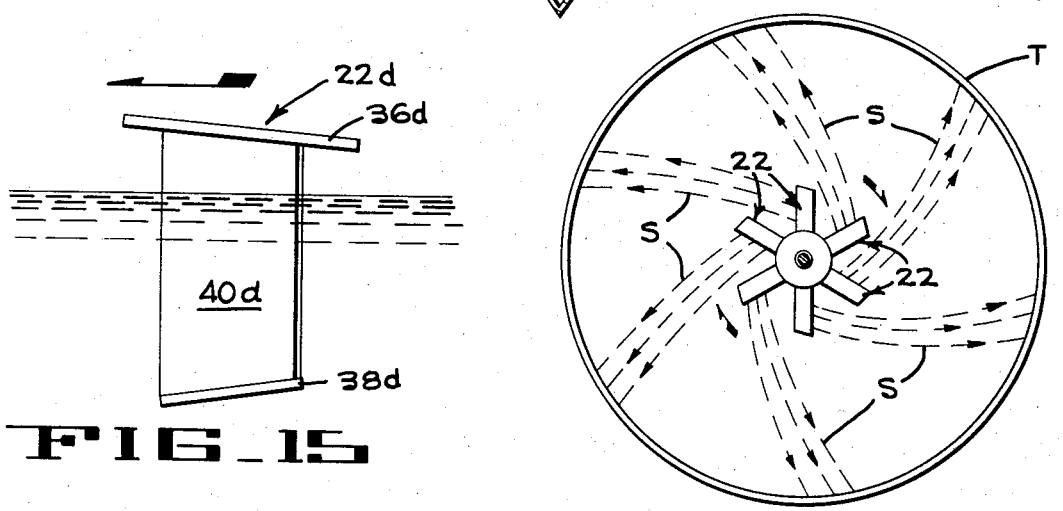
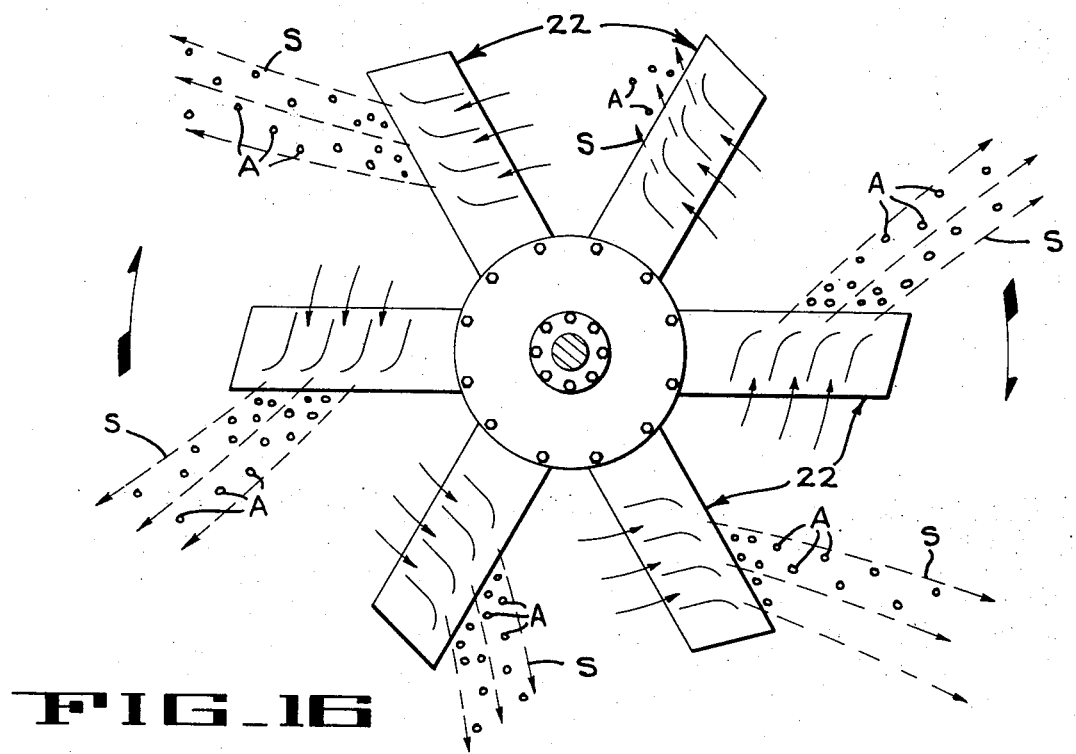

TURBOVENTILATOR FOR THE INPUT OF OXYGEN INTO LIQUIDS

REFERENCE TO RELATED APPLICATIONS

This application is a continuation-in-part of my copending application, Ser. No. 71,046, filed Sept. 10, 1970 and now abandoned.

DESCRIPTION OF PRIOR ART

Various systems of mechanical surface ventilators are known for the ventilation of water and waste water and for the supply of oxygen to activated sludge during biological waste-water purification. The main function of such mechanical surface aerators is provision of an oxygen input to the water that is obtained by mechanical action on the surface of the water that entrains and mixes air bubbles with the water. However, at the same time, mechanical surface aerators produce some circulation, by means of which the aerated water is mixed with dissolved and solid substance particles in the tank, preventing the sedimentation of substances that would otherwise be deposited.

A frequently utilized type of prior mechanical surface aerator is a turboblower, and various types of construction of such rotary aerators are known. The effects of oxygen input and of water circulation with the prior constructions mentioned, are obtained either by the rotary movement of stirring blades secured to the turbine, or by means of a spraying and blast action of the water conveyed through the blades or ducts of the turbine.

In the interests of economy, efforts have been made in prior turbine aerators to obtain a high oxygen input and high circulation volume while requiring a small consumption of energy. However, recent prior developments of turboventilators frequently correspond to conventional types of construction employed as hydraulical impellers for centrifugal pumps, but having lower speeds of rotation.

The U.S. patent of Thikotter U.S. Pat. No. 3,479,017, Nov. 18, 1969, shows a common type of radial blade rotor, the blades being covered by a top plate.

The U.S. patent to Weston U.S. Pat. No. 3,360,460, Dec. 26, 1967 shows a rotary plate having peripheral depending vanes radially disposed and circumferentially spaced. This construction is subject to the same deficiencies as Thikotter, previously mentioned.

In U.S. patent to Kalinske et al U.S. Pat. No. 3,154,601, Oct. 27, 1964, the top plate is submerged below the surface of the water by a critical distance. Substantial direction changing forces are exerted against the water and this device is principally a mere turbulence producing apparatus.

The U.S. patent to Auler et al U.S. Pat. No. 3,473,790, Oct. 21, 1969 shows a rotor that rotates within a fixed baffle at the surface of the water. Bubbles are created in sheets of water, some of which leave the surface of the water and flow over the top of the baffle, while others flow under the baffle.

The U.S. patent to Griesbach U.S. Pat. No. 2,800,315, July 23, 1957, shows a device for disbursing gas in a liquid wherein the rotor is at the bottom of the tank fed by a hollow hub and hollow radial arms that lead to a series of small tubes disposed at a 45° angle to the arms. As the rotor rotates the air entering through the hollow shaft and the radial arm emerges from the trailing ends of the small tubes.

SUMMARY OF THE INVENTION

Because of its rotating motion, during the operation of a turboventilator there is formed below the turboventilator, a vertical water whirlpool, that returns the water to stirring blades, paddles or ducts of the turboventilator. For effective oxygenation of the body of liquid, the water direction must be changed by 90° and directed radially. Even when the whirling movement of the water below prior turboventilators is braked by deflector crosses or deflector plates, there are created during the intake and deflection of the water, considerable turbulence losses, that on the conventional turboventilators have an unfavorable effect on water circulation.

In addition to the provision of effective air-mixing effects at the aerator turbine, a high water circulation performance across the tank is a condition for an economical utilization of the oxygen input at the aerator. However, conventional turboventilators, where an effort is made to obtain these conditions by hydraulically favorable types on construction, are of a very complicated and expensive construction.

In contrast to the prior and conventional turboventilators possessing vortex producing plates, feeder blades or ducts, in the present invention the water is formed into long lasting aeration jet streams by means of jet producing devices, and without turbulent deflection at the aerator as the water is taken from below the turbine and hence out of the whirlpool created there.

The aerator of the present invention comprises a plurality of circumferential spaced jet forming arms, each arm having box-like jet formers which are mounted to rotate at the surface layer of the liquid. These jet formers are bounded by upstanding, radially spaced vanes. The vanes are generally parallel and extend between upper and lower closure plates. The jet forming arms (made up of these box-like jet formers) are circumferentially spaced, thereby providing for unobstructed entry of liquid from between and in front of the arms and for entry of air from above the aerator. The vanes are short circumferentially and are widely spaced radially, thereby forming box-like structures. The vanes are inclined from a tangent to their path of motion in a direction such that their leading edges have a smaller radius of rotation than their trailing edges. As a result of this construction, the jet formers of the present invention accelerate the surface layer of liquid into diverging, horizontal jet streams that embody entrained air bubbles. These jet streams travel onto the walls of the tank (where used), whereupon they are diverted downwardly and hence carry air entrained at the aerator down into the main body of liquid into the tank for efficient aeration thereof.

It is a feature of the present invention that the water need not abruptly change its direction from a vertical to a horizontal motion at the entrance to aerator jet formers and hence clogging and depositing out of solid materials does not interfere with the aerating action.

The rotation of the box-like jet former structures of the present invention, at a velocity sufficient to produce a given degree of aeration, requires less horsepower than that required by prior aerators of the type previously mentioned, for a given oxygen input to the liquid.

BRIEF DESCRIPTION OF THE DRAWINGS

FIG. 1 is a side view of a turboventilator or aerator constructed in accordance with the present invention.

FIG. 2 is a plan view of the apparatus of FIG. 1.

FIG. 3 is a view, on a reduced scale, showing the turboventilator in a tank of water.

FIG. 4 is a side view of a modified form of turboventilator.

FIG. 4A is a section thru a fabricated tube jet former.

FIG. 5 is a plan view of a modified form of an aerator having six jet forming arms.

FIG. 6 is a side elevation of the aerator of FIG. 5 with the hub broken away.

FIG. 7 is an enlarged section of the hub.

FIG. 8 is an enlarged plan view of a jet former arm with parts broken away.

FIG. 9 is a front elevation of the arm of FIG. 8.

FIG. 10 is an end view of the arm.

FIG. 11 is a still further enlarged plan view showing the geometry of an aerator vane.

FIG. 14 is a section of still another form of aerator wherein the jet forming arms are inclined upwardly from the horizontal.

FIG. 15 is a view like FIG. 10 showing a modified jet former having inclined cover plates.

FIG. 16 is an enlarged plan operational diagram showing the jet forming action.

FIG. 17 is a diagram showing the aerator in a small tank that illustrates the formation of divergent jet streams by the aerator.

DETAILED DESCRIPTION

Figure 12:
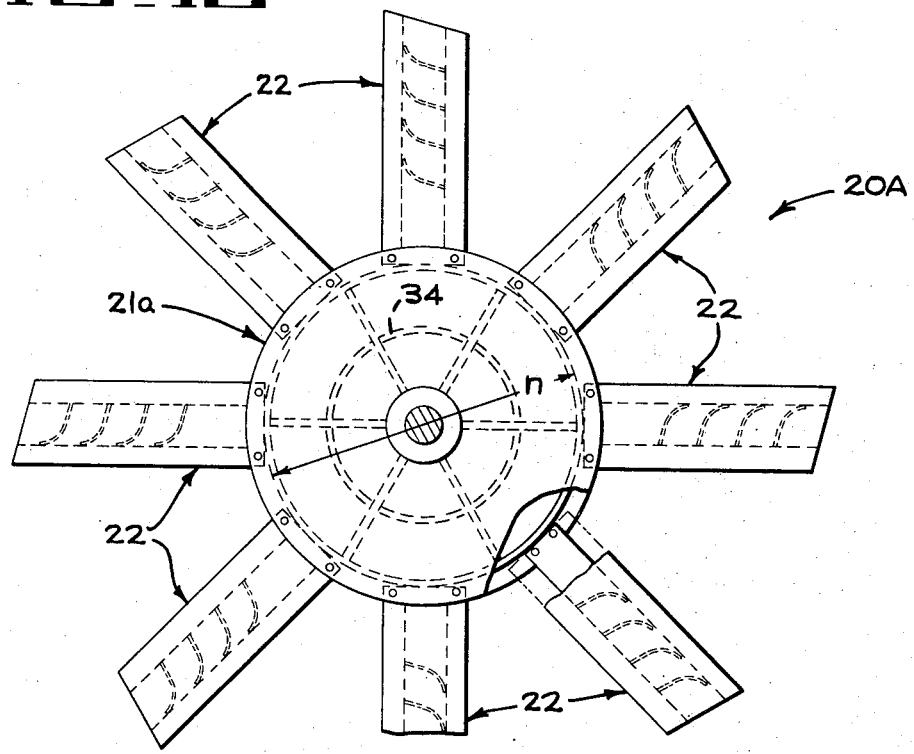
FIG. 12 is a plan view of an aerator like that of FIG. 5 but having eight arms instead of six as in FIG. 5.

As illustrated in an exemplified embodiment in FIGS. 1 – 3 the jet producing devices or jet former units, indicated generally at 1, comprise two superposed plates 2 and 2a and several vertical jet deflecting plates or vanes 3, thereby providing a number of flow or jet forming chambers 4. These chambers have water inlets 4a at their leading ends and jet stream outlets 4b at their trailing ends (FIG. 2).

The individual jet producing chambers 4 can also be assembled from prefabricated rectangular or tube profiles, as indicated at 16a, 16b and 16c, FIG. 4A.

Two, three or more of these jet producing units, as shown in FIG. 1, are suspended from radial arms 5, by posts 5a to produce a straight through turbine. The jet formers 1 are mounted with a slight tilt in relation to the horizontal, in the form shown in FIG. 1.

As seen in FIG. 3, during rotation of the aerator at the surface layer of water in a tank T, water is supplied to the aerator from the whirlpool W below. However, because of the unobstructed space between the jet forming arms, as the water actually enters the leading or intake apertures 4a of the individual chambers 4 of the jet aerators, relative motion between the jet formers and the water is substantially in a horizontal plane.

The vertical deflector plates or vanes 3 of the jet producing devices are inclined from a tangent to their path of motion and in a direction that can be defined as toward the direction of rotation of the turbine. Stated differently, the inclination is such that the leading edges of the vanes have a smaller radius of rotation than their trailing edges (FIG. 2). Thus during the flow of the water through the jet producing devices there are created zones of low pressure, where air is sucked into the jet flow.

The water is accelerated by the vanes 3 and then is flatly projected through the outlet apertures 4b. This produces a plurality of diverging jet streams S that embody entrained air bubbles A. These streams reach the tank walls (FIG. 3) and are diverted down, carrying the entrained air into the body of tank liquid. The liquid returns to the aerator via the whirlpool W, as explained. The change in direction of the water from the whirlpool W to the inlet apertures 4a is relatively gradual and smooth and is accomplished without the use of deflecting plates or baffles. Thus there is little turbulence at the inlets 4a of the jet former chambers 4 and hence any entrained material such as paper, etc. does not settle out and clog the aerator. Also, the long lasting, horizontal jet streams S and their entrained air bubbles A are produced with smaller power requirements than those of prior aeration that provide the same oxygen input.

The quantity of water projected in the form of the jets S is basically determined by the size of the cross-section apertures of the jet formers through which the water flows, and by the speed of rotation of the aerator. Typical dimensions for these parts will be described in detail relative to the modifications of FIGS. 5 – 13.

By changing the depth of immersion as well as by changing the speed of the aerator, it is possible to regulate the quantity of water that is projected by the jet streams, and thus also the amount of entrained air and hence the input of oxygen that is created by the jet effect. However, in all cases the aerator acts in the surface layer of water in the tank.

The present aerator also provides constructional advantages in that the jet producing devices can be readily made up with a selected number of chambers 4, and the dimensions of the chambers are readily determined by simple fabrication techniques. The jet formers are simple to fabricate and the desired number of individual jet forming chambers 4 can be readily provided on the distributor arms 5 of the aerator. Another advantage lies in the fact that individual jet former units 1 can be secured by means of a joint (not shown) in such a manner that they can have selected inclinations with the water surface, in which manner it is further possible to vary the output of the aerator.

The embodiment of FIG. 4 represents a further development of a turboventilator shown in FIGS. 1, 2 and 3 which reduces the weight load on the drive mechanism via the drive shaft, and improves the flow conditions below the turboventilator by centering the whirlpool W.

In FIG. 4 the aerator radial jet forming arms 11 are similar to the arms 1 of FIGS. 1 – 3, but these arms project radially from a closed cylindrical float F. A closed depending cone 15 is welded to the float F, and the float is mounted on a drive shaft 16. The jet former arms 11 have upper and lower cover plates 12, 12a that project radially from the float F. Vertical vanes or deflectors 13 extend between the plates 12, 12a as in the previous embodiment, to provide parallel jet forming chambers 14 of rectangular construction. The cylindrical float F and the cone 15 are watertight and may be formed of plastic or metal. The float may be either round or polygonal, and the arms 11 connected laterally to the float F by screws (not shown).

Because of the buoying forces of the composite float F and cone 15 to which the jet producing arms 11 are directly secured, the weight load on the drive system (not shown) and on the drive shaft 16 is reduced. By means of the preferably cone-shaped construction of the lower portion 15 of the float, the desired centering of the flow immediately below the aerator is obtained, and this improves the outflow conditions in the individual jet producing chambers 14.

An additional advantage in the construction of FIG. 4 is the elimination of the mounting arms 5 and posts 5a shown in FIGS. 1 and 2. Since ice can form under certain conditions on these mounting members during winter, this leads to an additional load on the drive aggregate.

As mentioned, the jet producing arms 11 can be detachably secured to the float F in a manner that is known as such, for instance by screws. The size of the float is suitably adapted to the length and number of the jet producing units secured to it, as well as to the buoying forces desired, and hence there are many possible combinations.

Figure 13:
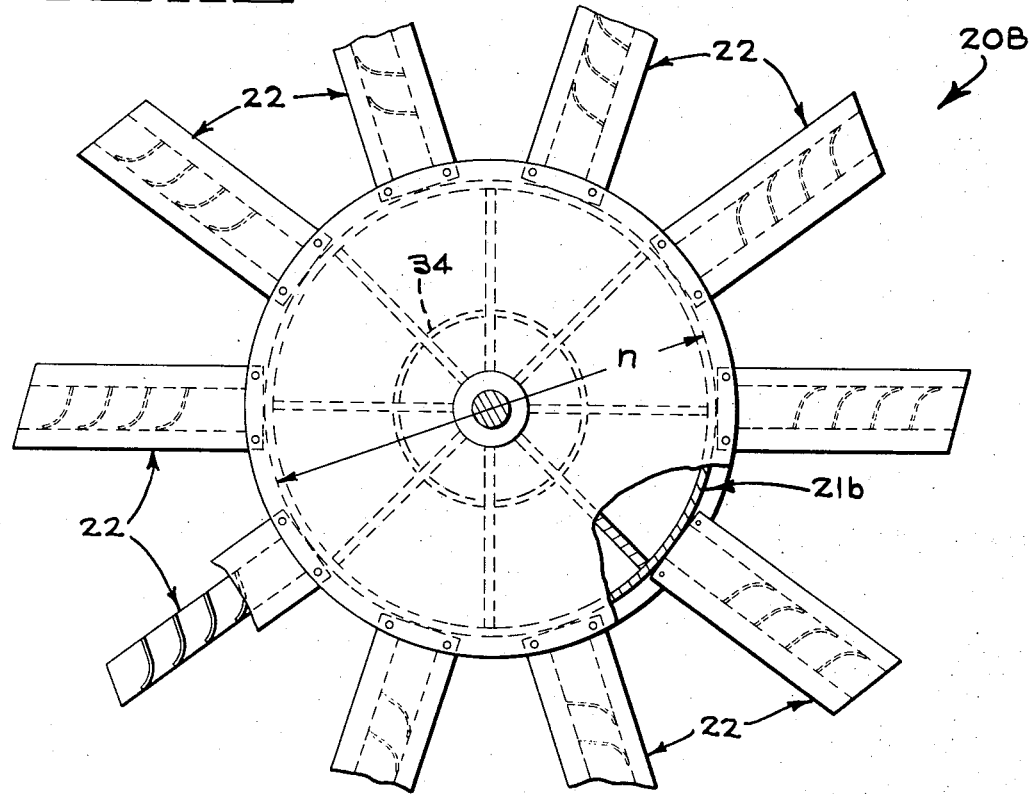
FIG. 13 is a plan view of still another form of aerator mounting 10 jet forming arms.

The aerator shown in FIGS. 5 through 12 embody a preferred embodiment of jet formers and otherwise resembles the float type aerator previously described in connection with FIG. 4. The construction of FIGS. 5, 12 and 13 represent designs wherein the floats are modified to receive 6, 8 and 10 jet forming arms of the type previously described. However, certain improvements in the jet forming arms are also disclosed in the embodiments now to be described in detail.

The aerator 20 (referring to FIGS. 5 – 7), has a central float indicated generally at 21 that mounts six jet forming arms 22 (FIG. 5). As seen in FIGS. 6 and 7, the float 21 is of closed cylindrical construction and has upper and lower circular plates 23, 24 that are welded to a central tube 26. The upper end of the tube 26 is flanged at 28 and is bolted to a similar flange mounted on a depending drive shaft 30. The drive shaft 30 is rotated by a motor or other source of power in a conventional manner.

A cylindrical wall 32 is welded adjacent the periphery of the upper and lower plates 23,24 to leave projecting mounting flanges for jet forming arms 22. Radial reinforcing plates 33 extend between the central tube 26 and the wall 32. A water tight cone 34 is welded to the lower plate 24 to form a centering cone and float construction in the manner previously described.

In the embodiment shown, the jet forming arms 22 have upper and lower cover plates 36,38 between which extend generally vertical vanes or deflectors 40 having the general purpose of those described in the previous embodiments. The cover plates 36,38 and the vanes 40 provide individual, box-like jet forming chambers 42, although, as previously mentioned, this number may be varied. The jet forming arms 22 are secured to the peripheral flanges on the upper and lower float plates 23,24 by upper screw bolts 39 and lower screws or bolts 39a.

Additional details of the jet forming arms 22 appear in FIGS. 8 – 11. For example, the ends 36a,38a of the upper and lower plates 36,38 are inclined to the direction of the path of the arms so that the leading edges of each plate are shorter than their trailing edges. In the example being described, the angle of inclination of the ends of the plates 36,38 to the path of the plates is about 15°.

The jet former arms 22 extend a distance a up to the first vane 40 (FIG. 8) and the vanes are provided along the remaining length b. The vanes 40 are uniformly spaced by a distance c, and have a circumferential extent indicated at d. As seen in FIG. 7, the float 21 has a major diameter indicated at n and the diameter of the central tube 26 is indicated at p.

As seen in FIGS. 8 and 10 the lower cover plate 38 is circumferentially coextensive with the deflector vanes 40 and hence has a width equal to d. However, the upper plate 36 has a greater width e and hence overhangs the trailing edges of the vanes 40 by a distance indicated at f in FIGS. 8 and 10. The plate 36 overhangs the leading edges of the vanes 40 by a smaller distance, indicated at f'. Thus the narrow, lower cover plate 38 does not impede access to the leading ends 42a of the jet forming chambers 42. The upper plate 36, although it is wider than the vanes, is normally above the surface of the water (FIG. 10) and hence does not act as a direction changing baffle for water entering the chambers 42.

By way of presenting design examples for a given sized installation so that those skilled in the art may practice the invention, the dimensions of the preferred vane constructions along with other dimensions illustrated in FIGS. 8 – 11 are given in Table I, to follow.

Another improvement of the preferred construction now being described over that of the previous embodiments, relates to the shape of the vanes 40. In the preferred embodiment these vanes are curved in the manner best seen in FIG. 11. Preferably the curvature of the vanes is compound, in that the vanes are made up of a circular arc portion 40a and a straight portion 40b. The straight portion 40b is leading, and is inclined at an angle g of about 15° with respect to a tangent to the motion of the vanes through the water.

Since the vanes are generally inclined from a tangent to their path of motion through the water, the blades accelerate the water in the horizontal plane thereby increasing its velocity and facilitating the creation of jet streams in the manner previously described. The curved construction of the individual vanes coupled, with their parallel orientation in the jet forming arms, further contributes to the acceleration of the water as it passes through the chambers 42 and hence to formation of the jet streams S. In addition to the action of the vanes due to their inclination and due to the curvature of the vanes individually, consideration will show that the effective width of the passageway 42 formed between vanes 40 progressively decreases slightly. Thus acceleration of the water into jet streams results from both the inclination of the vanes when from a tangent to their path of motion and from their curved construction coupled and their parallel disposition. This construction accelerates the water into the jet streams S without creating turbulence and at horsepower requirements lower than those of prior aerating devices.

The construction of the aerator 20a, FIG. 12 embodies the same jet forming arms 22 employed in the aerator 20 of FIGS. 5 – 7. However, the aerator 20A is formed with eight jet forming arms 22 (also at equal angular spacings), instead of six arms as in FIG. 5. In the form of FIG. 12, a float 21a is employed which is like the float 21 previously described in connection with FIG. 5 but has a larger diameter $n$ to accommodate the eight arms 22 instead of six as before, but at about the same substantially circumferential spacing. The cone 34 (seen only in dotted lines in FIG. 12) is of the same construction and size as cone 34 employed in the construction of FIGS. 5 – 7. The aerator 20A of FIG. 12 is rotated to give about the same tip speed to the jet forming arms as that imparted to the arms of FIG. 5. However, since there are more arms in the FIG. 12 construction, there will be a greater oxygen input with an attendant increase in horsepower requirements due to the increased aeration.

FIG. 13 shows an aerator 20B mounting ten jet forming arms 22. The only difference between this construction and those previously described is that here the float 21b has a diameter $n$ that is still larger than that of those previously described. However, the cone 34 has substantially the same dimensions as the cones provided with the previous embodiments.

As previously mentioned, various preferred design details and operating characteristics of the aerator just described are given in Table I, below.

Table I

Design Details

| Jet Arm Dimensions in Inches | | Preferred Geometry (FIGS. 8–11) |
|---|---|---|
| Spacing | $a$ 13. or 18.5 | |
| Arm | $b$ 34.5 | $d = 0.5c$ to $1.0c$ |
| Blade spacing | $c$ 7.86 | $j = 1.0c$ to $1.5c$ |
| Blade length | $d$ 7.86 angle | $g = 10°$ to $30°$, $15°$ preferred. |
| Plate width | $e$ 14.2 | |
| Plate overhang | $f$ 4.0 | Tip Speed of Innermost Vane |
| Vane height | $j$ 13.25 | 10 – 20 feet/sec. |
| Straight portion | $k$ 3.3 | Arm Angle $s$ (FIG. 14) |
| Curved portion | $l$ 6.2 | $10° - 30°$ |
| Radius | $m$ 6.9 | |

Hub Dimensions in Inches (FIG. 7)

| | 10 arms (FIG. 13) | 8 arms (FIG. 12) | 6 arms (FIG. 5) |
|---|---|---|---|
| Hub diameter $n$ | 81.25 | 57.5 | 34.2 |
| Tube diameter $p$ | 13.0 | 10.4 | 8.75 |

Cone — All Forms (FIG. 6)

| Cone height | $q$ | 23.5 inches |
|---|---|---|
| Angle | $r$ | 68° |

The aerator 20C of FIG. 14 is like the construction of FIGS. 5, 12 and 13 except in this case, the jet forming arms 22c are mounted on an inclination angle $s$ relative to the horizontal of the float 21c. The inclination angle $s$ should be in the order of 10° to 31°. with this construction, slightly different effects are obtained by varying the depth of immersion of the area relative to the surface of the water, although it is to be understood that in no case is the aerator run completely beneath the surface of the water.

FIG. 15 shows a modified form of the invention wherein the aerator arms 22d are formed so that their upper and lower plates 36d, 38d converge slightly towards their trailing edges. The vanes 40d extend generally vertically between the plates 36d, 38d in the manner previously described and in accordance with FIGS. 8 – 11.

This relative inclination of the cover plates for the blades provides a slight additional acceleration of the jet streams S without substantially increasing the horsepower requirements of the aerator.

FIG. 16 is a diagrammatic view illustrating the formation of the jet streams S as they emerge from the trailing ends of the jet formers 22. Air bubbles are shown at A to indicate schematically the entrainment of air by the jet streams, with resultant oxygenization of the surrounding liquid during operation of the aerator.

FIG. 17 is a plan view of a tank T embodying an aerator of the present invention and it shows how the jet stream S although they gradually diverge and may take curved paths, remain intact as moving bodies of water in the tank liquid until they reach the mouth of the tank. When these jet streams S reach the walls of the tank, they are gradually deflected downwardly and eventually work their way back into the aerator via the whirlpool W as previously described in connection with FIG. 3. In the meantime, the oxygen in the air bubbles entrained by the jet streams is gradually dissolved by the water over a substantial portion of the tank volume.

RÉSUMÉ OF THE INVENTION

Having described several forms of an improved, low power, high efficiency aerator, a résumé of the features and advantages of the aerator will be presented briefly by way of summary The aerator of the present invention requires no baffles to abruptly produce a turbulent change in direction of the water entering jet formers, the deposit of material in the jet passages, such as bits of paper or the like, does not occur with the resultant clogging of the passages.

An important requirement in mechanical aerators is that of prolonging the circulation of water that has entrained air, in order to provide oxygenization of as much as possible of the body of liquid in the tank. The aerators of the present invention produce oxygen laden jet streams that are long lasting, homogenous and have a relatively high horizontal surface velocity. This enables the jet streams to maintain their individuality and air entrainment action all the way to the wall of a reasonably sized tank. Furthermore, the jet streams are deflected at the tank wall and move down into the body of liquid. As a result of this, the entrained air incorporated into the jet streams provides oxygenization of the tank water over a large portion of its volume.

In a preferred embodiment of the invention, the top plates that cover the aerator vanes are wider than the bottom plates, so that the jets are maintained in the horizontal plane thereby reducing the amount of water sprayed into the atmosphere with an accompanying loss of effectiveness and increase in power requirements.

A feature of the present invention is that with modest power requirements, the aerator produces high velocity, smooth flowing, long lasting jet streams. These streams are generated by the inclination of the vanes relative to the tangent to their paths of motion through the water. Also, although the vanes may be straight (FIGS. 1 – 4) it has been found that curved vanes (FIG. 8) provide better acceleration of the water and thus facilitate the formation of the type of effective jet streams characteristic of the present invention.

It has been found that the aerator of the present invention, although it operates at the surface level of water in the tank, does not ice up and hence does not provide power and clogging problems as the result of ice found under difficult climatic conditions.

A feature of the present invention is that the amount of aeration for a given power input, or the amount of power input itself can be precisely controlled by simply varying the degree to which vertical vanes of the jet formers are submerged in the surface layer of water. Under no case is the aerator operated to produce a series of sprays at the surface, but rather it always produces jet streams in the surface layer of water. On the other the aerator is not entirely submerged because this mode of operation would not produce surface jet streams.

An important feature of the present invention is that the jet formers or aerator arms can be made of uniform construction and yet aerators of different oxygenation specifications and horsepower requirements can be constructed. This is accomplished simply by selecting the proper size of hub or float on which the arms are mounted and by selecting an appropriate number of arms.

The jet formers of the present invention can be characterized as large diameter, short length tubes, (preferably square tubes) which are moved at a relatively small inclination through the water and thus produce effective jet streams with low horsepower requirements without clogging problems. These tubes themselves are of such simple construction that they can be fabricated by conventional sheet metal operations which economies are implemented by the fact that the arms can be of modular construction, forming the basis for a number of aerators of various specifications.

Although the aerators of the present invention are effective in producing long lasting horizontal jet streams that are diverted at the tank walls, these streams are produced in a relatively nonturbulent fashion which do not upset the normal flow pattern of the water.

The aerator of the present invention can be readily provided with a central float forming the hub of the aerator, or with such a float augmented by attachment of cone for centering the whirlpool relative to the aerator.

Although the best mode contemplated for carrying out the present invention has been herein shown and described it will be apparent that modification and variation may be made without departing from what is regarded to be the subject matter of the invention.

I claim:

1. A mechanical aerator for introducing oxygen into a body of liquid comprising a generally vertical shaft, means for rotating said shaft, means mounting a plurality of circumferentially spaced, box-like jet formers on said shaft for rotation at the surface layer of liquid with the inlets and outlets of said jet formers partially submerged in the liquid; said jet formers comprising upstanding radially spaced vanes that are generally parallel, upper and lower closure plates for the vanes, said lower closure plates being circumferentially spaced to provide for the entry of liquid from below, the circumferential extent of said vanes being not substantially greater than twice the radial spacing of adjacent vanes, said vanes having their leading edges on a smaller radius of rotation than their trailing edges for horizontally accelerating the surface layer of liquid into diverging jet streams.

2. The aerator of claim 1, wherein said jet former closure plates are radially continuous with at least three substantially equally spaced vanes extending between the plates.

3. The aerator of claim 2, wherein the upper closure plates overhang the leading and trailing edges of said vanes.

4. The aerator of claim 3, wherein the lower closure plates are substantially horizontally coextensive with said vanes.

5. The aerator of claim 2, wherein said closure plates converge slightly toward their trailing edges.

6. The aerator of claim 2, wherein said vanes are curved with their concave faces facing forwardly.

7. The aerator of claim 6, wherein the leading portions of said vanes are straight.

8. The aerator of claim 1, wherein the circumferential extent of said vanes is in the range of about one half to one times the radial spacing of the vanes.

9. The aerator of claim 1, wherein the height of said vanes is in the range of about one to 1 ½ times the radial spacing of the vanes.

10. The aerator of claim 8, wherein the height of said vanes is in the range of about one to 1 ½ times the radial spacing of the vanes.

11. The aerator of claim 1, wherein the velocity of said vanes is about 10 – 20 feet/second.

12. The aerator of claim 1, wherein said jet formers are disposed so that the upper ends of said vanes are above the surface of the tank liquid.

13. An aerator for introducing oxygen into liquid in a tank comprising a generally vertical shaft, means for rotating said shaft, upper and lower hub discs on said shaft at the surface layer of liquid in the tank, a plurality of pairs of vertically spaced, spoke-like plates projecting radially from said discs, a plurality of liquid accelerating vanes extending generally vertically between each pair of plates to provide arms embodying box-like jet formers, said vanes having their leading edges on a smaller radius of rotation than their trailing edges for horizontally accelerating the surface layer of liquid into diverging jet streams.

14. The aerator of claim 13, wherein said hub discs are peripherally connected by a cylindrical baffle.

15. The aerator of claim 14, wherein said hub is watertight to form a float.

16. The aerator of claim 13, comprising a cone projecting down from the lower hub disc for controlling the whirlpool below the aerator.

17. The aerator of claim 13, wherein said jet former arms are inclined upwardly from their radially inner ends at about 10° to 30°.

18. A mechanical aerator for a large body of liquid comprising a vertical shaft, a plurality of relatively short, large cross section circumferentially extending jet forming tubes mounted on said shaft and at a substantial radial distance therefrom, said jet forming tubes having their sidewalls inclined from a tangent to their path of rotation so that their leading edges are closer to the shaft than their trailing edges, said tubes having a length that is not substantially more than twice their cross-sectional width, and means for rotating said shaft with the tubes at the surface layer of said body of liquid.

19. The aerator of claim 18, wherein said tubes are inclined about 10° to 30° with said tangent to their paths of rotation.

20. The aerator of claim 1, wherein said upper and lower closure plates are substantially flat and parallel and with the upper closure plate being disposed above the liquid surface.

* * * * *